United States Patent
Tu et al.

(10) Patent No.: US 12,468,653 B2
(45) Date of Patent: Nov. 11, 2025

(54) MICRO CONTROLLER UNIT, OPERATION SYSTEM, AND CONTROL METHOD

(71) Applicant: Nuvoton Technology Corporation, Hsinchu Science Park (TW)

(72) Inventors: Chieh-Sheng Tu, Hsinchu (TW); Ta-Chin Chiu, Hsinchu Science Park (TW)

(73) Assignee: NUVOTON TECHNOLOGY CORPORATION, Hsinchu Science Park (TW)

(*) Notice: Subject to any disclaimer, the term of this patent is extended or adjusted under 35 U.S.C. 154(b) by 24 days.

(21) Appl. No.: 18/319,771

(22) Filed: May 18, 2023

(65) Prior Publication Data
US 2024/0045826 A1 Feb. 8, 2024

(30) Foreign Application Priority Data
Aug. 4, 2022 (TW) ............................... 111129386

(51) Int. Cl.
G06F 13/42 (2006.01)
G06F 13/20 (2006.01)
G06F 13/40 (2006.01)

(52) U.S. Cl.
CPC .. G06F 13/4282 (2013.01); *G06F 2213/0002* (2013.01)

(58) Field of Classification Search
CPC .............................. G06F 13/10; H04N 1/0083
See application file for complete search history.

(56) References Cited

U.S. PATENT DOCUMENTS

| | | | |
|---|---|---|---|
| 2016/0150100 A1* | 5/2016 | Tanaka | H04N 1/0083 358/1.15 |
| 2019/0087377 A1 | 3/2019 | Srivastava et al. | |
| 2019/0324923 A1 | 10/2019 | Kelly et al. | |
| 2019/0391935 A1* | 12/2019 | Zhong | G06F 13/10 |
| 2020/0241652 A1* | 7/2020 | MacKay | G06F 13/4282 |
| 2022/0173962 A1* | 6/2022 | Yanagimachi | H04L 41/02 |
| 2022/0417293 A1* | 12/2022 | Cox | H04L 65/752 |
| 2023/0164725 A1* | 5/2023 | Wang | H04W 56/0015 370/350 |

FOREIGN PATENT DOCUMENTS

| | | |
|---|---|---|
| TW | 202127234 A | 7/2021 |
| TW | 202225990 A | 7/2022 |

OTHER PUBLICATIONS

Taiwan Office Action of the corresponding TW patent application No. 111129386 dated Apr. 14, 2023; pp. 1-7.

* cited by examiner

*Primary Examiner* — Getente A Yimer
(74) *Attorney, Agent, or Firm* — MUNCY, GEISSLER, OLDS & LOWE, P.C.

(57) ABSTRACT

A micro controller unit coupled between a master device and a slave device and including a first communication interface, a serial peripheral interface (SPI) circuit, a switch circuit, a second communication interface, and a switching control circuit is provided. The first communication interface receives a first external signal provided by the master device. The SPI circuit is configured to generate an internal signal. The switch circuit uses a second external signal or the internal signal as an output signal according to a control signal. The second communication interface provides the output signal to the slave device. The switching control circuit generates the control signal according to the level of the first external signal.

18 Claims, 5 Drawing Sheets

MICRO CONTROLLER UNIT, OPERATION SYSTEM, AND CONTROL METHOD

CROSS REFERENCE TO RELATED APPLICATIONS

This application claims priority of Taiwan Patent Application No. 111129386, filed on Aug. 4, 2022, the entirety of which is incorporated by reference herein.

BACKGROUND OF THE INVENTION

Field of the Invention

The invention relates to a micro controller unit (MCU), and more particularly to an MCU that is coupled between a master device and a slave device.

Description of the Related Art

In most serial interface peripheral (SPI) applications, a master device is usually coupled to at least one slave device. The master device accesses the data in the slave device and operates according to the data provided by the slave device. However, when the update procedure of the slave device fails, the slave device stores error data, and as a result, the master device cannot operate normally.

BRIEF SUMMARY OF THE INVENTION

In accordance with an embodiment of the disclosure, a micro controller unit is coupled between a master device and a slave device and comprises a first communication interface, a serial peripheral interface (SPI) circuit, a switch circuit, a second communication interface, and a switching control circuit. The first communication interface receives a first external signal provided by the master device. The SPI circuit is configured to generate an internal signal. The switch circuit uses a second external signal or the internal signal as an output signal according to a control signal. The second communication interface provides the output signal to the slave device. The switching control circuit generates the control signal according to the level of the first external signal.

In accordance with another embodiment of the disclosure, an operation system comprising a master device, a slave device, and a micro controller unit. The master device provides a first external signal. The slave device provides output data according to an output signal. The micro controller unit is coupled between the master device and the slave device and comprises a first communication interface, a SPI circuit, a switch circuit, a second communication interface, and a switching control circuit. The first communication interface receives the first external signal. The SPI circuit is configured to generate an internal signal. The switch circuit uses a second external signal or the internal signal as an output signal according to a control signal. The second communication interface provides the output signal to the slave device. The switching control circuit generates the control signal according to the level of the first external signal.

In accordance with a further embodiment of the disclosure, a control method applied to a micro controller unit comprises receiving a first external signal; determining the level of the first external signal; using an internal signal as an output signal in response to the level of the first external signal being equal to a predetermined level; using a second external signal as the output signal in response to the level of the first external signal not being equal to the predetermined level; and providing the output signal to a slave device. The first and second external signals are provided by a master device, and the micro controller unit is coupled between the master device and the slave device.

Control methods may be practiced by the micro controller unit or the operation system which have hardware or firmware capable of performing particular functions and may take the form of program code embodied in a tangible media. When the program code is loaded into and executed by an electronic device, a processor, a computer or a machine, the electronic device, the processor, the computer or the machine becomes a micro controller unit or an operation system for practicing the disclosed method.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Figure 1:
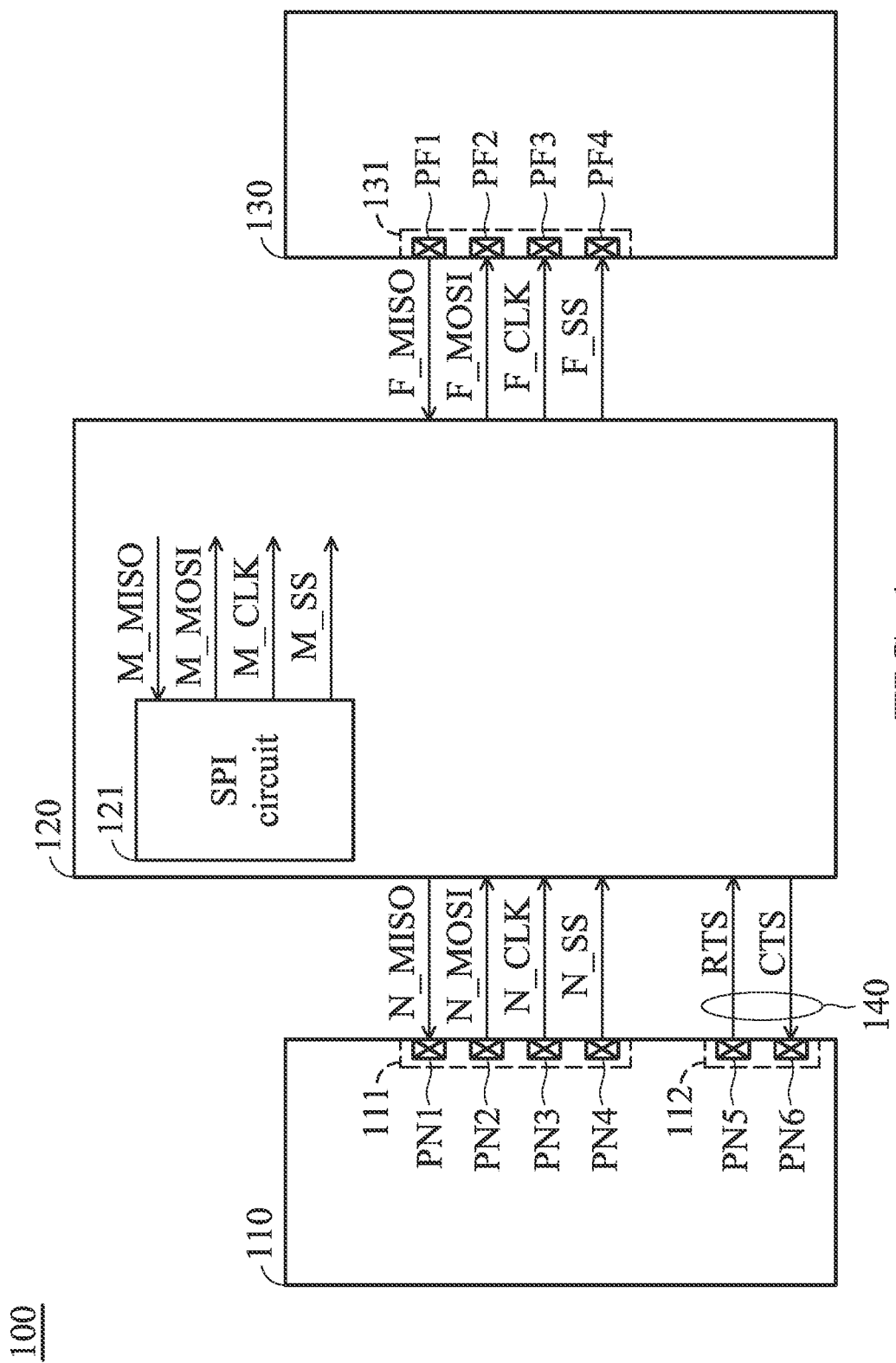
FIG. 1 is a schematic diagram of an exemplary embodiment of an operation system according to various aspects of the present disclosure.

The present invention will be described with respect to particular embodiments and with reference to certain drawings, but the invention is not limited thereto and is only limited by the claims. The drawings described are only schematic and are non-limiting. In the drawings, the size of some of the elements may be exaggerated for illustrative purposes and not drawn to scale. The dimensions and the relative dimensions do not correspond to actual dimensions in the practice of the invention.

FIG. 1 is a schematic diagram of an exemplary embodiment of an operation system according to various aspects of the present disclosure. The operation system 100 comprises a master device 110, a micro controller unit (MCU) 120, and a slave device 130. The MCU 120 is coupled between the master device 110 and the slave device 130. The kind of slave device 130 is not limited in the disclosure. In one embodiment, the slave device 130 is a flash memory. The master device 110 accesses the slave device 130 and sets internal registers in the master device 110 according to the output data provided by the slave device 130. In this case, the master device 110 operates according to the values of the internal registers in the master device 110.

The disclosure is not limited how the master device 110 accesses the slave device 130. In one embodiment, the master device 110 generates external signals N_MOSI, N_CLK, and N_SS to the MCU 120. In this cases, the MCU 120 uses the external signals N_MOSI, N_CLK, and N_SS as the output signals F_MOSI, F_CLK, and F_SS and provides the output signals F_MOSI, F_CLK, and F_SS to the slave device 130. Therefore, the slave device 130 generates output data F_MISO according to the output signals F_MOSI, F_CLK, and F_SS. The MCU 120 uses the output signal F_MISO as the output data N_MISO and provides the output data N_MISO to the master device 110. The master device 110 operates according to the output data N_MISO, for example, the master device 110 sets the internal registers in the master device 110.

However, when the slave device 130 stores incorrect data due to an update failure, since the master device 110 sets the internal register according to the incorrect data, the master device 110 cannot work normally. Therefore, the master device 110 triggers the MCU 120 so that the MCU 120 verifies and determines whether the data stored in the slave device 130 is correct.

In one embodiment, the MCU 120 calculates the output data F_MISO to determine whether the data in the slave device 130 is correct. In FIG. 1, the symbol M_MISO represents the output data F_MISO. When the data stored in the slave device 130 is not correct, the MCU 120 writes an original program code to the slave device 130 and directs the master device 110 re-accesses the slave device 130. Since the data stored in the slave device 130 is changed, the master device 110 is capable of operating normally according to the output data F_MISO provided by the slave device 130. In this embodiment, since the MCU 120 is capable of accessing the slave device 130, the MUC 120 can be referred to as a master device.

The invention does not limit how the master device 110 triggers the MCU 120. In one embodiment, the master device 110 triggers the MCU 120 according to at least one of the external signals N_MOSI, N_CLK, and N_SS. For example, when the master device 110 cannot operate normally according to the output data F_MISO of the slave device 130, the master device 110 sets the external signal N_SS to a predetermined level, such as a low level. Therefore, the MCU 120 does not use the external signals N_MOSI, N_CLK, and N_SS as the output signals F_MOSI, F_CLK, and F_SS temporarily. In one embodiment, the MCU 120 generates internal signals M_MOSI, M_CLK, and M_SS and uses the internal signals M_MOSI, M_CLK, and M_SS to access the slave device 130. In this case, the MCU 120 uses the internal signals M_MOSI, M_CLK, and M_SS as the output signals F_MOSI, F_CLK, and F_SS. The slave device 130 provides the output data F_MISO according to the internal signals M_MOSI, M_CLK, and M_SS. The MCU 120 receives and verifies the output data F_MISO. In this embodiment, the symbol M_MISO represents the output data F_MISO entering the MCU 120.

When the output data F_MISO is not correct, the MCU 120 utilizes the internal signals M_MOSI, M_CLK, and M_SS to change the data stored in the slave device 130. In one embodiment, the MCU 120 writes an original program code to the slave device 130. In this case, the MCU 120 may notify the master device 110 that the data stored in the slave device 130 has been changed. Therefore, the master device 110 re-generates the external signals N_MOSI, N_CLK, and N_SS. At this time, since the external signal N_SS is not equal to the predetermined level, the MCU 120 uses the external signals N_MOSI, N_CLK, and N_SS as the output signals F_MOSI, F_CLK, and F_SS and provides the output signals F_MOSI, F_CLK, and F_SS to the slave device 130. Since the data stored in the slave device 130 has been changed, when the slave device 130 provides the output data F_MISO according to the external signals N_MOSI, N_CLK, and N_SS, the master device 110 can operate normally according to the output data N_MISO.

In this embodiment, since the external signals N_MOSI, N_CLK, and N_SS conform with a serial peripheral interface (SPI) protocol, the MCU 120 at least comprises a SPI circuit 121. The SPI circuit 121 generates the internal signals M_MOSI, M_CLK, and M_SS and the internal signals M_MOSI, M_CLK, and M_SS conform with the SPI protocol. In other embodiments, when the external signals generated by the master device 110 conform with other protocols, the MCU 120 comprises other kinds of signal generator circuits.

In other embodiments, the master device 110 communicates with the MCU 120 via a specific communication interface 140. In this case, the specific communication interface is a serial interface, such as a universal asynchronous receiver/transmitter (UART) communication interface or an inter-integrated circuit bus (I2C). The master device 110 utilizes the specific communication interface 140 to direct the MCU 120 to access the slave device 130 or direct the MCU 120 to hand over access control. For example, the master device 110 may send a request signal RST to direct the MCU 120 to hand over access control. In this case, the MCU 120 sends a response signal CTS to notify the master device 110 to access the master device 130.

In some embodiments, when the master device 110 enters a power-down mode, the MCU 120 accesses the slave device 130 to determine whether the data stored in the slave device 130 is legal. When the data stored in the slave device 130 is tampered, the MCU 120 writes an original program code to the slave device 130. In one embodiment, when the master device 110 enters a power-down mode, the master device 110 utilizes at least one of the output signals F_MOSI, F_CLK, and F_SS to notify the MCU 120.

The circuit structure of master device 110 is not limited in the present disclosure. In one embodiment, the master device 110 at least comprises a communication interface 111. The communication interface 111 has pins PN1~PN4. The pin PN1 is configured to receive the output data N_MISO. The pin PN2 is configured to output the external signal N_MOSI. The pin PN3 is configured to output the external signal N_CLK. The pin PN4 is configured to output the external signal N_SS.

In one embodiment, when the master device 110 determines that the data stored in the slave device 130 is not correct according to the output data N_MISO, the master device 110 sets the level of the pin PN4 to a predetermined level. In some embodiments, the master device 110 may set the level of other pin (e.g., one of the pins PN1~PN3) to the predetermined level or set the levels of at least two of the pins PN1~PN4. The kind of communication interface 111 is not limited in the present disclosure. In one embodiment, the communication interface is a SPI.

In other embodiments, the master device 110 further comprises a communication interface 112. The communication interface 112 comprises pins PN5 and PN6. In this case, the master device 110 communicates with the MCU 120 via the communication interface 112. The kind of communication interface 112 is not limited in the present disclosure. The communication interface 112 may be different from the communication interface 111. For example, the communication interface 112 is a UART communication interface, and the communication interface 111 is a SPI.

The circuit structure of slave device 130 is not limited in the present disclosure. In one embodiment, the slave device 130 is a memory, such as a flash memory. In this embodiment, the slave device 130 at least comprises a communication interface 131. The communication interface 131 comprises pins PF1~PF4. The pin PF1 is configured to provide the output data F_MISO. The pin PF2 is configured to receive the output signal F_MOSI. The pin PF3 is configured to receive the output signal F_CLK. The pin PF4 is configured to receive the output signal F_SS. The kind of communication interface 131 is not limited in the present disclosure. In some embodiments, the kind of communication interface 131 is the same as the kind of communication interface 111, such as the communication interfaces 111 and 131 are SPIs.

Figure 2:
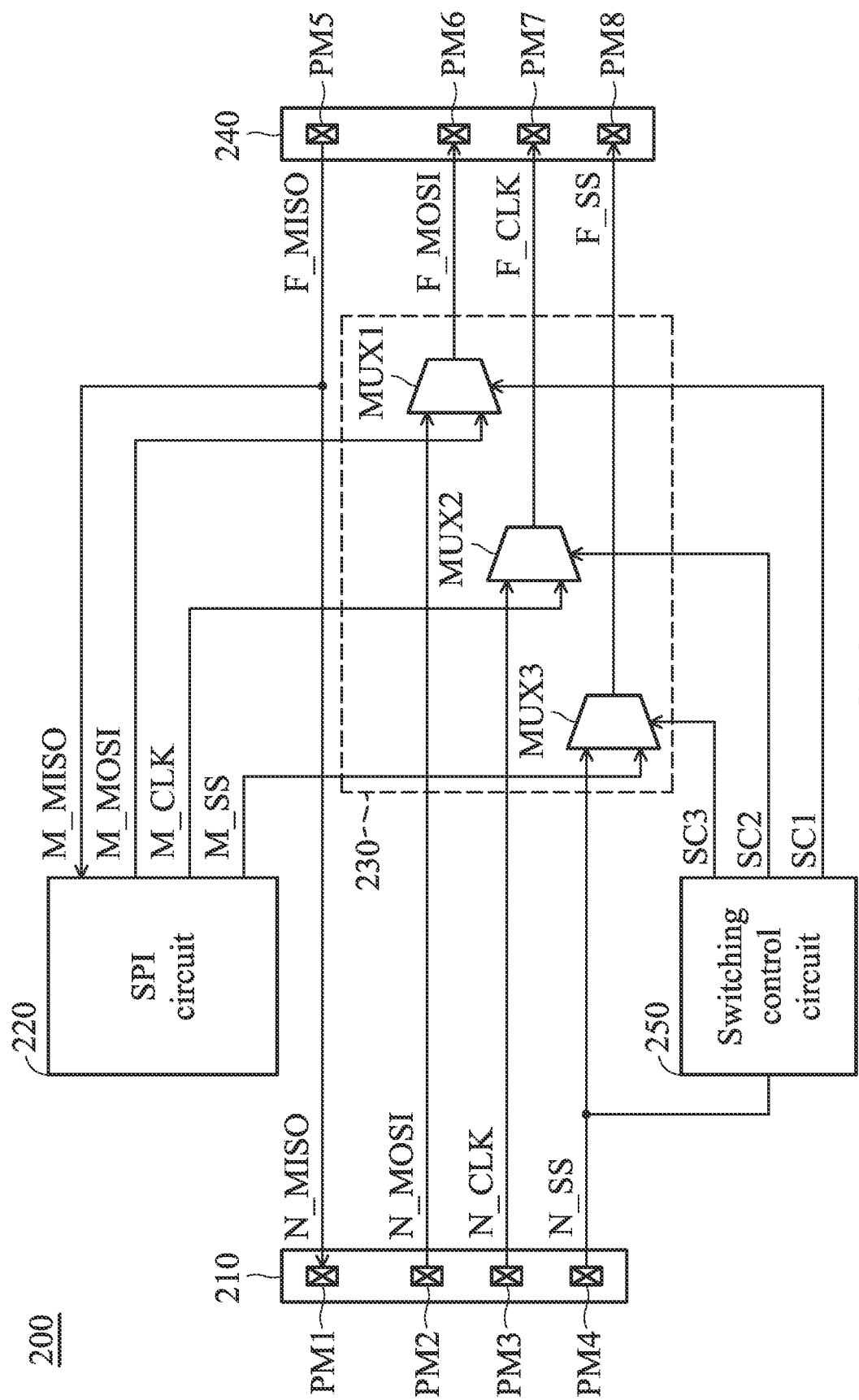
FIG. 2 is a schematic diagram of an exemplary embodiment of a micro controller unit according to various aspects of the present disclosure.

FIG. 2 is a schematic diagram of an exemplary embodiment of a micro controller unit according to various aspects of the present disclosure. The MCU 200 at least comprises communication interfaces 210 and 240, a SPI circuit 220, a switch circuit 230, and a switching control circuit 250. The communication interface 210 comprises pins PM1~PM4. The pin PM1 is configured to output the output data N_MISO. The pin PM2 is configured to receive the external signal N_MOSI. The pin PM3 is configured to receive the external signal N_CLK. The pin PM4 is configured to receive the external signal N_SS. In one embodiment, the communication interface 210 is the same as the communication interface 111, such as a SPI.

The SPI circuit 220 receives the output data M_MISO and generates the internal signals M_MOSI, M_CLK, and M_SS. In some embodiments, when the level of the external signal M_SS is equal to a predetermined level, the SPI circuit 220 generates the internal signals M_MOSI, M_CLK, and M_SS. When the level of the external signal M_SS is not equal to the predetermined level, the SPI circuit 220 does not generate the internal signals M_MOSI, M_CLK, and M_SS provisionally.

The switch circuit 230 receives the external signals N_MOSI, N_CLK, and N_SS and the internal signals M_MOSI, M_CLK, and M_SS and uses the external signals N_MOSI, N_CLK, and N_SS or the internal signals M_MOSI, M_CLK, and M_SS as the output signals F_MOSI, F_CLK, and F_SS according to the control signals SC1~SC3. The structure of switch circuit 230 is not limited in the present disclosure. In this embodiment, the switch circuit 230 comprises multiplexers MUX1~MUX3.

The multiplexer MUX1 uses the external signal N_MOSI or the internal signal M_MOSI as the output signal F_MOSI according to the control signal SC1. For example, when the control signal SC1 is at a first level, the multiplexer MUX1 uses the external signal N_MOSI as the output signal F_MOSI. In this case, when the control signal SC1 is at a second level, the multiplexer MUX1 uses the internal signal M_MOSI as the output signal F_MOSI.

The multiplexer MUX2 uses the external signal N_CLK or the internal signal M_CLK as the output signal F_CLK according to the control signal SC2. In one embodiment, when the control signal SC2 is at a third level, the multiplexer MUX2 uses the external signal N_CLK as the output signal F_CLK. In this case, when the control signal SC2 is at a fourth level, the multiplexer MUX2 uses the internal signal M_CLK as the output signal F_CLK.

The multiplexer MUX3 uses the external signal N_SS or the internal signal M_SS as the output signal F_SS according to the control signal SC3. For example, when the control signal SC3 is at a fifth level, the multiplexer MUX3 uses the external signal N_SS as the output signal F_SS. In this case, when the control signal SC3 is at a sixth level, the multiplexer MUX3 uses the internal signal M_SS as the output signal F_SS.

In one embodiment, the first, the third, and the fifth levels are the same. For example, each of the first, the third, and the fifth level is a low level. The second, the fourth, and the sixth levels are the same. For example, each of the second, the fourth, and the sixth level is a high level. In another embodiment, the multiplexers MUX1~MUX3 receive the same control signal, such as the control signal. In other embodiments, at least one of the first, the second, the third, the fourth, the fifth, and the sixth levels is a low level, and another of the first, the second, the third, the fourth, the fifth, and the sixth levels is a high level.

The communication interface 240 comprises pins PM5~PM8. The pin PM5 is directly connected to the pin PM1 and the SPI circuit 220. In this embodiment, the pin PM5 receives the output data F_MISO and provides the output data F_MISO to the pin PM1 and the SPI circuit 220. The symbol M_MISO represents the output data F_MISO transmitted to the SPI circuit 220. The symbol N_MISO represents the output data F_MISO transmitted to the pin PM1. The pin PM6 is configured to output the output signal F_MOSI. The pin PM7 is configured to output the output signal F_CLK. The pin PM8 is configured to output the output signal F_SS. In one embodiment, the kind of communication interface 240 is the same as the kind of communication interface 210.

The switching control circuit 250 generates the control signals SC1~SC3 according to at least one of the external signals N_MOSI, N_CLK, and N_SS. In this embodiment, the switching control circuit 250 detects the level of the external signal N_SS. When the level on the pin PM4 of the communication interface 210 is equal to a predetermined level (e.g., a low level), the switching control circuit 250 utilizes the control signals SC1~SC3 to direct the switch circuit 230 to use the external signals N_MOSI, N_CLK, and N_SS as the output signals F_MOSI, F_CLK, and F_SS. When the level on the pin PM4 of the communication interface 210 is not equal to a predetermined level, the switching control circuit 250 utilizes the control signals SC1-SC3 to direct the switch circuit 230 to use the internal signals M_MOSI, M_CLK, and M_SS as the output signals F_MOSI, F_CLK, and F_SS. In this embodiment, the switching control circuit 250 generates three control signals SC1-5C3, but the disclosure is not limited thereto. In other embodiments, the switching control circuit 250 may generate a single control signal. In this case, the multiplexers MUX1~MUX3 provides the output signals F_MOSI, F_CLK, and F_SS.

Figure 3:
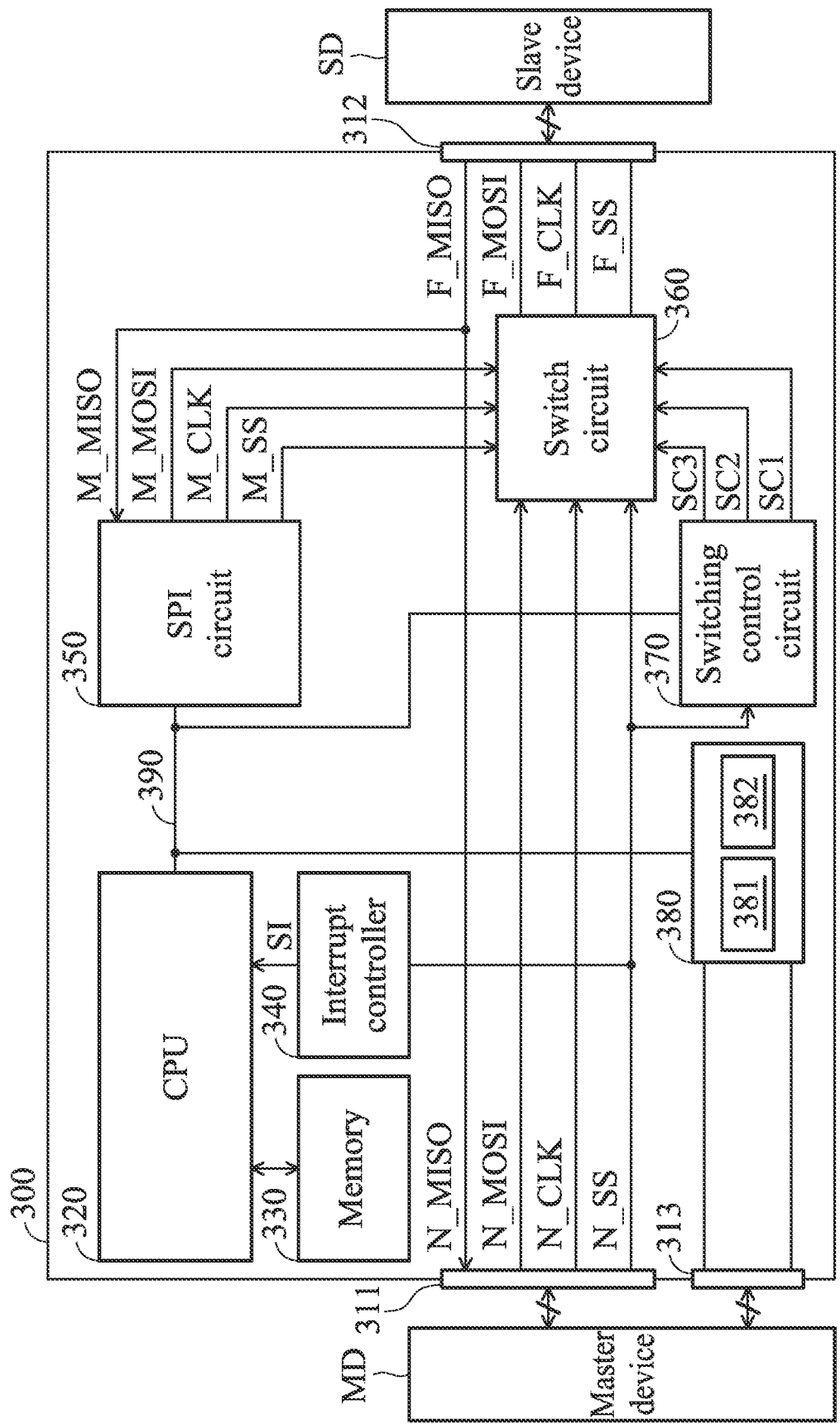
FIG. 3 is a schematic diagram of another exemplary embodiment of the micro controller unit according to various aspects of the present disclosure.

FIG. 3 is a schematic diagram of another exemplary embodiment of the micro controller unit according to various aspects of the present disclosure. The MCU 300 is coupled between a master device MD and a slave device SD. In this embodiment, the MCU 300 comprises communication interfaces 311~313, a CPU 320, a memory 330, an interrupt controller 340, a SPI circuit 350, a switch circuit 360, and a switching control circuit 370. Since the characteristics of the communication interfaces 311 and 312, the SPI circuit 350, the switch circuit 360, and the switching control circuit 370 shown in FIG. 3 are similar to the characteristics of the communication interfaces 210 and 240, the SPI circuit 220, the switch circuit 230, and the switching control circuit 250 shown in FIG. 2, the related description is omitted here. Additionally, the characteristics of the master device MD and the slave device SD shown in FIG.

3 are similar to the characteristics of the master device 110 and the slave device 130 shown in FIG. 1, the related description is omitted here.

The CPU 320 communicates with the SPI circuit 350 and the switching control circuit 370 via a bus 390. In one embodiment, when the level of the external signal N_SS is equal to a predetermined level, the switching control circuit 370 notifies the CPU 320 via the bus 390. Therefore, the CPU 320 directs the SPI circuit 350 to generate the internal signals M_MOSI, M_CLK, and M_SS. At this time, the switching control circuit 370 utilizes the control signals SC1-5C3 to direct the switch circuit 360 to use the internal signals M_MOSI, M_CLK, and M_SS as the output signals F_MOSI, F_CLK, and F_SS.

In some embodiments, the CPU 320 utilizes the bus 390 to receive and detect the output data M_MISO (i.e., the output data F_MISO) received by the switching control circuit 350. The invention does not limit how the CPU 320 detects the output data M_MISO. In one embodiment, the CPU 320 calculates the output data M_MISO to obtain a checksum. The CPU 320 compares the checksum with a reference sum. When the checksum is equal to the reference sum, it means that the output data M_MISO is correct. When the checksum is not equal to the reference sum, it means that the output data M_MISO is not correct.

When the output data M_MISO is not correct, the CPU 320 accesses the memory 330 to retrieve an original program code. The CPU 320 provides the original program code to the SPI circuit 350 via the bus 390. The SPI circuit 350 generates the internal signals M_MOSI, M_CLK, and M_SS to update the data stored in the slave device SD according to the original program code.

In some embodiment, the interrupt controller 340 enables an interrupt signal SI according to the level of the external signal N_SS. Therefore, the CPU 320 directs the switching control circuit 370 to set the control signals SC1~SC3 so that the switch circuit 360 uses the internal signals M_MOSI, M_CLK, and M_SS as the output signals F_MOSI, F_CLK, and F_SS.

In other embodiments, the MCU 300 further comprises a control circuit 380. The control circuit 380 is coupled to the communication interface 313 and comprises a universal asynchronous receiver 381 and a universal asynchronous transmitter 382. The universal asynchronous receiver 381 receives a request signal (e.g., the request signal RST shown in FIG. 1) generated by the master device MD via the communication interface 313. The universal asynchronous transmitter 382 is coupled to the communication interface 313 to provide a response signal (e.g., the response signal CTS shown in FIG. 1) to the master device MD.

In one embodiment, the CPU 320 communicates with the master device MD via the control circuit 380. For example, when the master device MD wants to access the slave device SD, the master device MD sends a request signal. In this case, the universal asynchronous receiver 381 triggers the CPU 320. The CPU 320 utilizes the switching control circuit 370 to direct the switch circuit 360 to use the external signals N_MOSI, N_CLK, and N_SS as the output signals F_MOSI, F_CLK, and F_SS. The CPU 320 sends a response signal to the master device MD via the universal asynchronous transmitter 382.

In some embodiments, when the master device MD cannot work normally according to the output data F_MISO provided by the slave device SD, the master device MD sets the external signal M_SS at a predetermined level. Therefore, the switch circuit 360 uses the internal signals M_MOSI, M_CLK, and M_SS as the output signals F_MOSI, F_CLK, and F_SS. At this time, the slave device SD provides the output data N_MISO according to the output signals F_MOSI, F_CLK, and F_SS. The CPU 320 verifies and determines whether the output data M_MISO is correct. When the output data M_MISO is not correct, the CPU 320 provides an original program code to the SPI circuit 350. The SPI circuit 350 adjusts the internal signals M_MOSI, M_CLK, and M_SS to update the data stored in the slave device SD according to the original program code. In one embodiment, the CPU 320 notifies the master device MD via the communication interface 313 and directs the switch circuit 360 via the switching control circuit 370 so that the switch circuit 360 uses the external signals N_MOSI, N_CLK, and N_SS as the output signals F_MOSI, F_CLK, and F_SS. Since the data stored in the slave device SD has been updated into correct data, the master device MD is capable of working normally according to the output data N_MISO provided by the slave device SD.

In other embodiments, when the master device MD operates in a power-down mode, the master device MD sets the level of at least one of the external signals N_MOSI, N_CLK, and N_SS. Assume that the master device MD sets the level of the external signal N_SS to a predetermined level. Since the level of the external signal N_SS is equal to the predetermined level, the switching control circuit 370 directs the switch circuit 360 to use the internal signals M_MOSI, M_CLK, and M_SS as the output signals F_MOSI, F_CLK, and F_SS. At this time, the CPU 320 verifies the output data M_MISO to determine whether the data stored in the slave device SD has been tampered. When the data stored in the slave device SD has been tampered, the CPU 320 changes the data stored in the slave device SD via the SPI circuit 350. When the master device MD exits the power-down mode, the master device MD makes the level of the external signal N_SS not equal to the predetermined level. Therefore, the switching control circuit 370 directs the switch circuit 360 to use the external signals N_MOSI, N_CLK, and N_SS as the output signals F_MOSI, F_CLK, and F_SS. At this time, since the data stored in the slave device SD is legal, the master device MD works normally.

Figure 4:
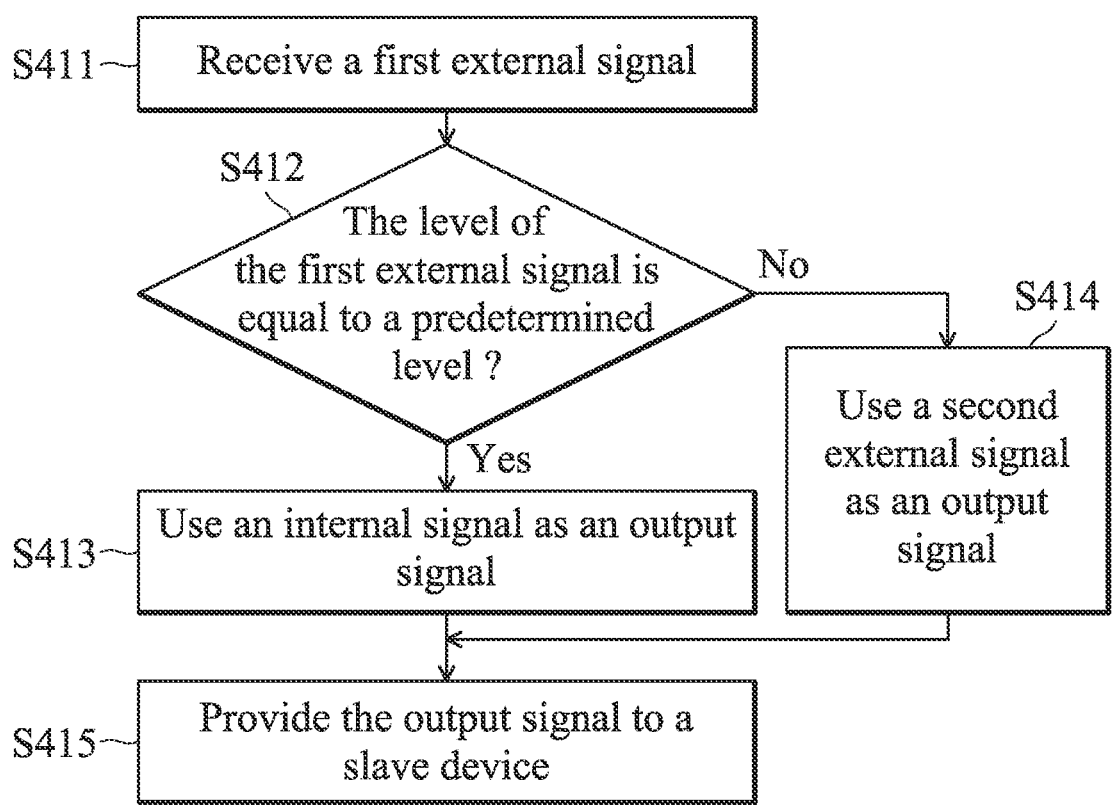
FIG. 4 is a flowchart of an exemplary embodiment of a control method according to various aspects of the present disclosure.

FIG. 4 is a flowchart of an exemplary embodiment of a control method according to various aspects of the present disclosure. The control method is applied in an MCU, such as the MCU 200 of FIG. 2 or the MCU 300 of FIG. 3. First, a first external signal is received (step S411). In one embodiment, the first external signal is provided by a master device.

Then, a determination is made as to whether the level of the first external signal is equal to a predetermined level (step S412). When the level of the first external signal is equal to the predetermined level, an internal signal is used as an output signal (step S413). When the level of the first external signal is not equal to the predetermined level, a second external signal is used as the output signal (step S414). In one embodiment, the second external signal is also provided by the master device. In another embodiment, the second external signal is the first external signal. In other words, step S414 serves the first external signal as the output signal.

Next, the output signal is provided to a slave device (step S415). In one embodiment, after receiving the output signal, the slave device provides output data to the MCU. In this case, when the level of the first external signal is not equal to the predetermined level, the MCU directly provides the output data to the master device. The master device sets its internal registers according to the output data. However, when the level of the first external signal is equal to the predetermined level, the MCU determines whether the output data is correct. When the output data is not correct, the MCU writes an original program code to the slave device.

In some embodiments, the MCU further receives a transfer request provided by the master device. In this case, the MCU uses the second external signal or the internal signal as the output signal according to the transfer request. For example, if the master device wants to access the slave device, the master device sends a transfer request. The MCU stops providing the internal signal to the slave device provisionally. At this time, the MCU provides the external signal provided by the master device to the slave device.

Figure 5:
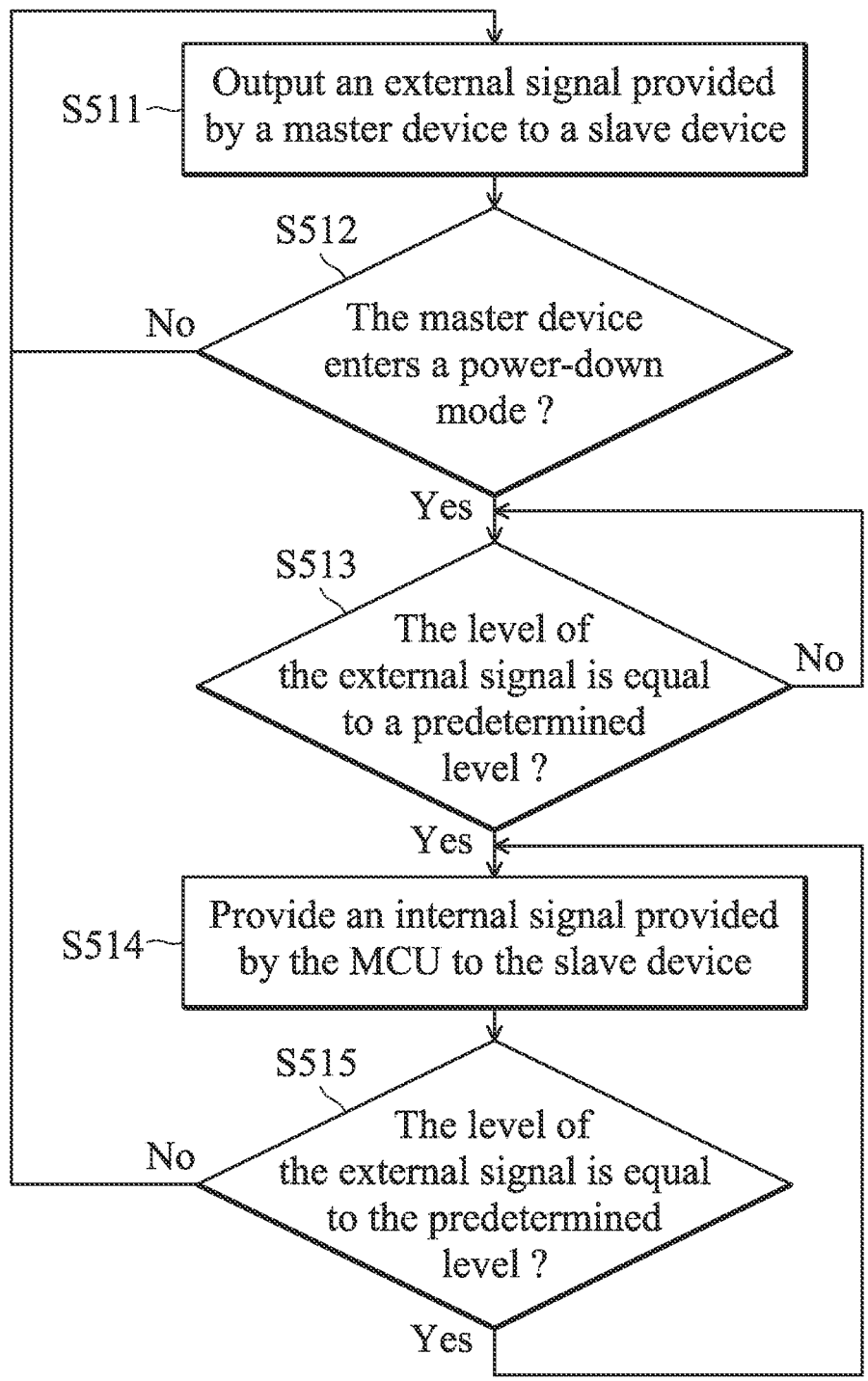
FIG. 5 is a flowchart of another exemplary embodiment of the control method according to various aspects of the present disclosure.

FIG. 5 is a flowchart of another exemplary embodiment of the control method according to various aspects of the present disclosure. First, at least one external signal provided by a master device is output to a slave device (step S511). Then, a determination is made as to whether the master device enters a power-down mode (step S512). When the master device enters a power-down mode, a determination is made as to whether the level of the external signal provided by the master device is equal to a predetermined level (step S513). When the level of the external signal is not equal to the predetermined level, step S513 is performed. However, when the level of the external signal is equal to the predetermined level, an internal signal provided by the MCU is provided to the slave device (step S514).

Then, a determination is made as to whether the level of the external signal provided by the master device is still equal to the predetermined level (step S515). If the level of the external signal provided by the master device is still equal to the predetermined level, step S514 is performed so that the MCU continually accesses the slave device. If the level of the external signal provided by the master device is not equal to the predetermined level, step S511 is performed so that the master device accesses the slave device.

In one embodiment, when the MCU provides the internal signal to the slave device, the slave device provides output data. In this case, the MCU checks whether the output data has been falsified. When the output data has been falsified, the MCU adjusts the internal signal to change the data stored in the slave device. Therefore, when the master device re-accesses the slave device, the master device is capable of operating normally.

In other embodiments, the slave device provides output data according to the external signal provided by the master device. In this case, the master device sets the values of the internal registers in the master device according to the output data and operates according to the values of the internal registers. However, when the output data is incorrect, the master device cannot operate normally. Therefore, when the master device determines that the data stored in the slave device is incorrect, the master device sets the level of an external signal to a predetermined level. In this case, the MCU provides at least one internal signal to the slave device to detects the output data provided by the slave device. When the output data is not correct, the MCU changes the data stored in the slave device, for example, the MCU writes an original program code to the slave device. When the output data is correct, the MCU notifies the master device to direct the master device to re-access the slave device.

Control methods, or certain aspects or portions thereof, may take the form of a program code (i.e., executable instructions) embodied in tangible media, such as floppy diskettes, CD-ROMS, hard drives, or any other machine-readable storage medium, wherein, when the program code is loaded into and executed by a machine such as a computer, the machine thereby becomes an MCU or an operation system for practicing the methods. The methods may also be embodied in the form of a program code transmitted over some transmission medium, such as electrical wiring or cabling, through fiber optics, or via any other form of transmission, wherein, when the program code is received and loaded into and executed by a machine such as a computer, the machine becomes an MCU or an operation system for practicing the disclosed methods. When implemented on a general-purpose processor, the program code combines with the processor to provide a unique apparatus that operates analogously to application-specific logic circuits.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein. It will be understood that although the terms "first," "second," etc. may be used herein to describe various elements, these elements should not be limited by these terms. These terms are only used to distinguish one element from another.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A micro controller unit coupled between a master device and a slave device and comprising:
   a first communication interface comprising:
   a first pin receiving a first external signal provided by the master device;
   a second pin receiving a second external signal provided by the master device; and
   a third pin outputting output data to the master device;
   a serial peripheral interface (SPI) circuit configured to generate an internal signal;
   a switch circuit using the second external signal or the internal signal as an output signal according to a control signal;
   a second communication interface providing the output signal to the slave device, receiving the output data from the slave device, and providing the output data to the third pin;
   a switching control circuit generating the control signal according to the level of the first external signal;
   a third communication interface; and
   a central processing unit (CPU) using the third communication interface to communicate with the master device,
   wherein in response to the master device not operating normally according to the output data, the master device sets the level of the first external signal to a predetermined level,
   wherein in response to the level of the first external signal being equal to the predetermined level, the switching control circuit directs the switch circuit to use the internal signal as the output signal, and
   wherein in response to the level of the first external signal not being equal to the predetermined level, the switching control circuit directs the switch circuit to use the second external signal as the output signal, and wherein the CPU verifies the output data, and in response to the output data not being correct, the CPU utilizes the output signal to provide an original program code to the salve device and notifies the master device so that the master device sets the level of the first external signal to be not equal to the predetermined level.

2. The micro controller unit as claimed in claim 1, wherein the first master device conforms with a first communication protocol, the second communication interface conforms with a second communication protocol, the third communication interface conforms with a third communication protocol, the third communication protocol is different from the first communication protocol, and the first communication protocol is the same as the second communication protocol.

3. The micro controller unit as claimed in claim 2, wherein the third communication interface receives a request signal from the master device, and the CPU controls the switching control circuit to adjust the control signal according to the request signal.

4. The micro controller unit as claimed in claim 3, further comprising:
a universal asynchronous receiver coupled to the third communication interface to receive the request signal; and
a universal asynchronous transmitter coupled to the third communication interface to provide a response signal, wherein:
the universal asynchronous receiver triggers the CPU according to the request signal so that the CPU controls the communication protocol to adjust the control signal,
after adjusting the control signal, the CPU triggers the universal asynchronous transmitter so that the universal asynchronous transmitter provides the response signal.

5. The micro controller unit as claimed in claim 1, wherein the second communication interface provides the output data to the SPI circuit.

6. The micro controller unit as claimed in claim 5, wherein the CPU receives the output data via the SPI circuit and determines whether the output data is correct.

7. The micro controller unit as claimed in claim 6, wherein in response to the output data not being correct:
the SPI circuit adjusts the internal signal according to the original program code to write the original program code to the slave device.

8. The micro controller unit as claimed in claim 7, further comprising:
a memory configured to store the original program code.

9. The micro controller unit as claimed in claim 1, further comprising:
an interrupt controller enabling an interrupt signal according to the level of the first external signal,
wherein in response to the interrupt signal having been enabled, the CPU directs the switching control circuit to set the control signal so that the switch circuit uses the internal signal as the output signal.

10. An operation system comprising:
a master device providing a first external signal and a second external signal;
a slave device providing output data according to an output signal; and
a micro controller unit coupled between the master device and the slave device and comprising:
a first communication interface comprising:
a first pin receiving the first external signal;
a second pin receiving the second external signal; and
a third pin outputting the output data to the master device;
a serial peripheral interface (SPI) circuit configured to generate an internal signal;
a switch circuit using the second external signal or the internal signal as an output signal according to a control signal;
a second communication interface providing the output signal to the slave device, receiving the output data from the slave device, and providing the output data to the third pin;
a switching control circuit generating the control signal according to the level of the first external signal; and
a central processing unit (CPU) verifying the output data in response to the first external signal being equal to the predetermined level,
wherein in response to the the master device not operating normally according to the output data, the master device sets the level of the first external signal to a predetermined level,
wherein in response to the level of the first external signal being equal to a predetermined level, the switching control circuit directs the switch circuit to use the internal signal as the output signal, and
wherein in response to the level of the first external signal not being equal to the predetermined level, the switching control circuit directs the switch circuit to use the second external signal as the output signal,
wherein:
the CPU verifies the output data to determine whether the output data is correct,
in response to the output data not being correct, the CPU directs the switch circuit to use the internal signal as the output signal via the switching control circuit, and notifies the master device so that the master device sets the level of the first external signal to be not equal to the predetermined level,
the internal signal is an original program code,
the slave device updates the output data according to the internal signal.

11. The operation system as claimed in claim 10, wherein the master device receives the output data via the first and second communication interfaces.

12. The operation system as claimed in claim 10, wherein:
in response to the master device entering a power-down mode, the master device sets the first external signal to equal to the predetermined level.

13. The operation system as claimed in claim 12, wherein:
in response to the master device exiting the power-down mode, the master device sets the first external signal so that the first external signal is not equal to the predetermined level.

14. A control method applied to a micro controller unit and comprising:
receiving a first external signal;
determining the level of the first external signal;
verifying output data in response to the level of the first external signal being equal to a predetermined level;
using an internal signal as an output signal in response to the output data not being correct;
using a second external signal as the output signal in response to the level of the first external signal not being equal to the predetermined level; and
providing the output signal to a slave device,
wherein:

the first and second external signals are provided by a master device, and the micro controller unit is coupled between the master device and the slave device, and the output data is provided from the slave device.

15. The control method as claimed in claim 14, further comprising:

serving an original program code as the internal signal and providing the internal signal to the slave device in response to the output data not being correct, wherein the output data is provided by the slave device.

16. The control method as claimed in claim 14, further comprising:

receiving a transfer request provided by the master device; and using the second external signal or the internal signal as the output signal according to the transfer request.

17. The micro controller unit as claimed in claim 1, wherein the CPU calculates the output data to obtain a checksum and compares the checksum with a reference sum, and wherein in response to the checksum not being equal to the reference sum:

the CPU provides the original program code to the SPI circuit so that the SPI circuit generates the internal signal;

the switching control circuit directs the switch circuit uses the internal signal as the output signal; and the second communication interface provides the output signal to the slave device to update the data stored in the slave device.

18. The operation system as claimed in claim 10, further comprising:

a third communication interface;

a universal asynchronous receiver coupled to the third communication interface to receive a request signal; and a universal asynchronous transmitter coupled to the third communication interface to provide a response signal, wherein:

the CPU uses the third communication interface to communicate with the master device, the first master device conforms with a first communication protocol, the second communication interface conforms with a second communication protocol, the third communication interface conforms with a third communication protocol, the third communication protocol is different from the first communication protocol, and the first communication protocol is the same as the second communication protocol, the third communication interface receives the request signal from the master device, and the CPU controls the switching control circuit to adjust the control signal according to the request signal, the universal asynchronous receiver triggers the CPU according to the request signal so that the CPU controls the communication protocol to adjust the control signal, after adjusting the control signal, the CPU triggers the universal asynchronous transmitter so that the universal asynchronous transmitter provides the response signal.

* * * * *